United States Patent
Baker et al.

(10) Patent No.: US 6,861,396 B2
(45) Date of Patent: Mar. 1, 2005

(54) COMPOSITIONS FOR PRE-TREATING SHOES AND METHODS AND ARTICLES EMPLOYING SAME

(75) Inventors: Keith Homer Baker, Cincinnati, OH (US); Donna Jean Haeggberg, Cincinnati, OH (US); Mary Vijayarani Barnabas, West Chester, OH (US); Yong Zhu, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 54 days.

(21) Appl. No.: 09/785,876

(22) Filed: Feb. 16, 2001

(65) Prior Publication Data

US 2002/0077263 A1 Jun. 20, 2002

Related U.S. Application Data

(63) Continuation-in-part of application No. 09/693,224, filed on Oct. 20, 2000, now abandoned.

(51) Int. Cl.$^7$ .................................................. C11D 9/44
(52) U.S. Cl. ........................ 510/109; 510/275; 510/276; 510/299
(58) Field of Search ................................ 510/109, 275, 510/276, 299

(56) References Cited

U.S. PATENT DOCUMENTS

| | | | |
|---|---|---|---|
| 4,138,352 A | 2/1979 | Teot et al. ................... | 252/139 |
| 4,214,997 A | 7/1980 | Morris et al. ................ | 252/88 |

(List continued on next page.)

FOREIGN PATENT DOCUMENTS

| | | |
|---|---|---|
| BR | 93040393 A | 6/1995 |
| DE | 4229660 A1 | 10/1994 |
| EP | 0786514 A2 | 7/1997 |
| EP | 0 801 165 A2 | 10/1997 |
| GB | 378400 | 8/1932 |
| GB | 1 566 326 | 4/1980 |
| JP | 55151099 | 11/1980 |
| JP | 58067777 | 4/1983 |
| JP | 63288187 | 11/1988 |
| JP | 63317192 | 12/1988 |
| JP | 09087685 | 3/1997 |
| JP | 09271597 | 10/1997 |
| JP | 2000014965 | 1/2000 |
| WO | WO9700738 | 1/1997 |
| WO | WO9936499 | 7/1999 |
| WO | WO0029538 | 5/2000 |
| WO | WO0029539 | 5/2000 |
| WO | WO 00/65015 | 11/2000 |
| WO | WO 01/30955 A1 | 5/2001 |

OTHER PUBLICATIONS

Commercial products (27 pages).
Anthony J. O'Lenick, Jr., Soil Release Polymers; Journal of Surfactants and Detergents; vol. 2, No. 4, Oct., 1999; AOCS Press, Dacula Georgia.

*Primary Examiner*—Yogendra N. Gupta
*Assistant Examiner*—Eisa Eihilo
(74) *Attorney, Agent, or Firm*—Jeffrey V. Bamber; Kim William Zerby; Steven W. Miller (57) ABSTRACT

Compositions for treating shoes, especially canvas and/or leather-containing shoes, such as athletic shoes, and methods and articles of manufacture employing same to treat the shoes prior to and/or during and/or after washing the shoes are disclosed. The compositions are used to pre-treat the shoes prior to soiling of the shoes.

13 Claims, 4 Drawing Sheets

U.S. PATENT DOCUMENTS

| | | |
|---|---|---|
| 4,285,841 A | 8/1981 | Barrat et al. |
| 4,441,881 A | 4/1984 | Ruppert et al. ............... 8/137 |
| 4,497,919 A | 2/1985 | Varga et al. ................. 524/10 |
| 4,767,563 A * | 8/1988 | de Buzzaccarini ..... 252/174.25 |
| 5,017,237 A | 5/1991 | Svensson et al. ............. 134/4 |
| 5,306,435 A * | 4/1994 | Ishikawa et al. .......... 252/8.57 |
| 5,356,968 A | 10/1994 | Rupaner et al. ........... 524/460 |
| 5,431,840 A | 7/1995 | Soldanski et al. ....... 282/174.1 |
| H001513 H | 1/1996 | Murch et al. |
| 5,576,282 A | 11/1996 | Miracle et al. |
| 5,599,782 A | 2/1997 | Pan et al. ................. 510/249 |
| 5,807,438 A | 9/1998 | Lansbergen et al. |
| 5,837,670 A | 11/1998 | Hartshorn |
| 5,883,064 A | 3/1999 | Baeck et al. |
| 5,891,838 A | 4/1999 | Angell et al. |

\* cited by examiner

COMPOSITIONS FOR PRE-TREATING SHOES AND METHODS AND ARTICLES EMPLOYING SAME

CROSS REFERENCE TO RELATED PATENT APPLICATIONS

This application is a continuation-in-part of U.S. patent application Ser. No. 09/693,224, filed on Oct. 20, 2000 abandoned.

FIELD OF THE INVENTION

The present invention relates to compositions for treating shoes, especially canvas or other fabric containing shoes that may also contain leather, such as athletic shoes and methods and articles of manufacture employing such compositions to treat the shoes prior to and/or during and/or after washing the shoes. More particularly, the present invention relates to compositions applied to one or more shoes prior to and/or during and/or after washing the shoes for imparting a desired benefit to the shoes such as cleaning and/or conditioning and/or disinfecting and/or deodorizing.

BACKGROUND OF THE INVENTION

Soiled and/or stained shoes, especially athletic shoes, have been a problem since the advent of shoes. Traditional attempts at cleaning soiled and/or stained shoes have included washing the soiled shoes manually in wash basins and/or sinks, with a conventional garden hose, clapping the shoes together to attempt to dislodge clay, mud and other dirt fixed to the shoes, or using a conventional washing machine with or without detergent being added. However, consumers have encountered less than satisfactory cleaning by these conventional methods. Further, consumers have witnessed the damage to the shoes as a result of employing these "harsh" conventional methods, especially when washing the shoes in a conventional washing machine. Examples of such problems include, but are not limited to, poor, less than satisfactory cleaning of the shoes and/or the tendency of water and/or detergent to remove tanning agents and/or fatliquors from leather in the shoes resulting in loss of stability and/or softness and/or suppleness and/or flexibility.

Cleaning represents a significant and largely unmet consumer need for shoes, especially shoes that contain canvas, nylon, mesh, synthetic leather and/or natural leather surfaces, particularly leather-containing shoes, such as athletic shoes. Athletic shoes are worn not just for athletic use but also for casual use both indoor and outdoor. The outdoor and athletic use of these shoes can lead to significant soiling of these shoes. For instance, dirt, mud, and clay soils may soil these when worn outdoors for either sporting or casual use. Similarly, grass stains and soils may soil these shoes under similar circumstances. A particular problem for cleaning shoes is that unlike many "dress" or formal shoes, the outer parts of the athletic shoes may consist of leather or fabrics or combinations of the two. Most formal shoes have a glossy smooth outside surface and are generally not as heavily soiled as athletic shoes often are. Thus for the formal shoes, wiping with a damp cloth is often sufficient to clean these shoes under most circumstances. Unlike most formal shoes with glossy smooth outside finishes, the athletic shoes are more heavily soiled and that soil is often more difficult to remove because of the many types of outer coverings for the athletic shoes. In particular, it is difficult to simply wipe the off the soil from the fabric parts in these shoes. Similarly the soil from the rough or uneven plastic, synthetic or rubber surfaces found on the bottom portions of these shoes is also often difficult to remove. As such, a better method for cleaning athletic shoes is needed and is highly desirable.

Further, while not wishing to be bound by theory, it is believed that the conventional washing of shoes in water and/or detergent-containing water has deleterious effects on the shoes, especially leather-containing shoes because among other reasons, the loss of fatliquors and/or oils and/or tanning agents such as Chromium from the leather.

Conventional washing of shoes in an automatic clothes washing machine damages the shoes as a result of the shoes coming into contact with the agitator in the washing machine and/or walls of the washing machine and/or with other articles, such as other shoes, being washed. Without being bound by theory, it is believed that such contact can damage the paint on the shoes as well as damage other surfaces and/or components of the shoes.

Similarly, it has been found that for canvas or other cloth shoes, the removal of clay or mud soils is particularly difficult and often more difficult to remove than those same soils on leather surfaces of athletic shoes. It has been found that the conventional washing treatments can work reasonably well at times for clay/mud/dirt on canvas or other fabric containing shoes, when shoes are composed of only canvas or other fabrics.

However, certain types of shoes, particularly athletic shoes, often contain both canvas/cloth and leather. Thus, heretofore there has been an unacceptable tradeoff between the need to protect the leather while cleaning the canvas. Moreover, even if a consumer's athletic shoes are composed only of leather, or only of canvas, it would inconvenient to the consumer to purchase separate products for canvas and leather containing shoes.

Accordingly, there is a need for compositions for pre-treating canvas/cloth and leather shoes and methods employing such compositions to treat canvas/cloth and leather that produce desired cleaning results on canvas portions of shoes without damaging the leather portion of shoes.

While other methods have been proposed, none appear to work sufficiently well to meet the needs of the consumer. For example, JP 58-067,777, teaches a spray pre-treat for canvas shoes comprising both a starch and carboxymethycellulose (CMC) gives a benefit. However, it suffers from a numbers of problems. First, this patent publication teaches nothing as to how to avoid the highly undesirable spotting that may occur especially on non-canvas surfaces such as leather, particularly darker colored leather, when CMC is applied to the shoes. Moreover, nothing is taught as to the molecular weight or the degree of substitution for either the carboxymethycellulose or the starch that are required for optimum performance. Similarly, no provision is made for the incorporation of other highly desired properties such as disinfection, faster drying, and odor removal.

Furthermore, consumers may wish to avoid the use of spray product and make the treatment of the shoes an integral part of the wash process. The above patent publication makes no allowance for this by providing a method for pre-treating shoes as an integral part of the wash process such that a soil resistance benefit is given.

Yet furthermore, this patent publication does not teach methods and compositions wherein treating compositions and cleaning compositions work together so as to produce a benefit unexpected based on the performances of either alone.

SUMMARY OF THE INVENTION

The present invention relates to compositions and methods for treating shoes, especially shoes that contain canvas, nylon, mesh, synthetic leather and/or natural leather surfaces, particularly leather-containing shoes such as athletic shoes. More particularly, the present invention relates to methods, especially methods which include a step of pre-treating shoes prior to the soiling of the shoes, and compositions useful in the methods of the present invention and articles of manufacture that use the compositions to treat shoes.

Without wishing to be bound by any particular theory, in one aspect of the invention, the composition for treating or pre-treating the shoes comprises a substance that is believed to form a protective deposit or barrier, such as a film, on at least portions of the shoes such that the removal of the soil from the shoes in subsequent cleanings is substantially better than without the pre-treatment.

The pre-treating composition may, in this aspect of the invention or any other aspect of the invention, optionally, but preferably, be used with preferred cleaning and/or conditioning compositions which are preferably particularly suitable for cleaning shoes containing leather portions. The cleaning compositions and/or conditioning compositions can be used individually, or together. If used together, they can be in the form of a cleaning and conditioning system. In other embodiments, the cleaning and conditioning compositions can be combined into a single "two-in-one" cleaning and conditioning composition.

In one embodiment, the pre-treating composition comprises a polymeric soil release agent and a spreading agent. In one non-limiting variation of this embodiment, the composition for treating or pre-treating the shoes comprises a polysaccharide and a spreading agent. The spreading agent is useful reducing the tendency for the composition to bead up and fail to spread on the surfaces of the shoes. It is also useful in reducing the spotting problem that occurs on shoes, particularly darker shoes, which have non-porous surfaces, such as leather or plastic. The polysaccharide can have any suitable molecular weight (MW). In certain embodiments, the polysaccharide may have a molecular weight of less than about 1,000,000, or less than about 500,000, or less than about 250,000. In one variation of this embodiment, the polysaccharide comprises carboxymethylcellulose (CMC). It is not necessary to use starch with the CMC in the compositions described herein. The composition may comprise a CMC with a degree of substitution ranging from about 0.6 to about 1.2. The spreading agent is preferably a surfactant, and can be an anionic or nonionic surfactant.

In another embodiment, the compositions for treating the shoes can comprise a first depositing protective substance (or "pre-treating composition") that, again without wishing to be bound to any particular theory, is believed to form a protective deposit or barrier on at least portions of the shoes, and this composition is used in conjunction with a second removing substance that is capable of removing the first substance and any soil deposited on the first protective substance from the shoes. The pre-treating composition can be applied by the shoe manufacturer, by the shoe retailer, or by the purchaser or owner of the shoes. The pre-treating composition can be applied after the owner of the shoes cleans the shoes so that soils can more easily be removed from the shoes. As in the case of the first embodiment described above, the first depositing protective substance may form a film on the surface of the shoes. In preferred versions of this embodiment, the second removing substance is selected to be especially suitable for removing the first substance from the shoes. Suitable removing substances include, but are not limited to enzymes. The removing substances can be separate compositions, or the cleaning and/or conditioning composition, or both, may contain the removing substance, e.g., the enzyme, and the use of the pre-treatment composition, prior to the wear of the shoes, and subsequent treatment with cleaning and/or conditioning compositions containing this enzyme, when used after the cleaning and/or conditioning composition, preferably produces a benefit greater than cleaning and/or conditioning alone without the pre-treatment step. Numerous examples of such combinations of protective compositions and removing substances are possible. In one non-limiting set of embodiments, the protective compositions are carbohydrate biopolymers and the removing substances are carbohydrases. In another set of embodiments, the protective compositions are polypeptide biopolymers and the removing substances are proteases. In another set of embodiments, the protective compositions are polyester polymers and the removing substances are lipases, esterases, and/or polyesterases.

The compositions described herein can have additional benefit agents (such as antimicrobial agents, odor control agents, and drying agents allowing for faster drying when the pre-treatment contains a substantial proportion of water) provided therein, or such additional benefit agents may be provided in separate compositions. In one non-limiting example, the pre-treatment composition is in the form of a spray that can be applied to the inside of the shoes, the outside of the shoes, or both, which comprises ethanol to provide a quick drying disinfectant.

All percentages and proportions herein are by weight, and all references cited herein are hereby incorporated by reference, unless otherwise specifically indicated.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF THE INVENTION

Definitions

The terms "pre-wear treatment" and "pre-treat" as used herein, are interchangeable, and are meant to encompass any application of one or more pre-treating compositions of the present invention to one or more shoes prior to the soiling of the shoes. The soiling of the shoes may thereafter be followed by washing the one or more shoes. It is understood that the compositions and methods described herein may be used in a cycle of treating, wearing (and, thus, soiling), and washing of the shoes. For example, the initial pre-treating can be followed by a period of wearing the shoes, and then washing the shoes. The shoes can thereafter again be "pre-treated". Thus, the pre-treating compositions may chronologically follow the soiling of the one or more shoes, and still be considered to be applied as pre-treatments.

The pre-treating compositions of the present invention comprise an "effective amount" of a benefit agent. An "effective amount" of a benefit agent is any amount capable of imparting the benefit associated with the benefit agent to an article, such as a shoe or any portion thereof, preferably any canvas, nylon, mesh, and synthetic leather and/or natural leather surface thereof.

"Through the wash" as used herein is meant to encompass any application of one or more compositions to one or more shoes during washing of the one or more shoes.

"Post-treat" as used herein is meant to encompass any application of one or more compositions to one or more shoes after washing the one or more shoes.

"Benefit agents" as used herein is meant to encompass any agent that can impart a consumer recognizable and/or measurable benefit to an article, such as a shoe. Examples of such benefit agents includes, but is not limited to, cleaning agents, conditioning agents, disinfecting agents, perfumes, brighteners, release agents, especially soil release agents, enzymes, water-proofing agents, odor control agents, and the like, and mixtures thereof.

"Shoe(s)" as used herein is meant to encompass any and all surfaces and portions of a shoe, preferably any canvas, nylon, mesh, and synthetic leather and/or natural leather surface thereof. The types of shoes treatable with the compositions and methods described herein include, but are not limited to athletic shoes (e.g., running shoes, basketball shoes, cross-training shoes, tennis shoes, bowling shoes, and other types of athletic shoes), and shoes made out of similar materials, and having a similar construction, such as shoes worn by hospital employees, and the like.

"Washing" as used herein is meant any means of contacting a shoe with an aqueous medium. Examples of such washing include, but are not limited to, submerging, partially or completely, the shoe in a washtub or other receptacle, such as a sink or a pan, spraying the shoe with water from a garden hose or other means of delivering water such as a faucet, allowing rain drops to contact the shoe, submerging, partially or completely, the shoe in a body of water, such as a river, lake or pond, submerging the shoe in an aqueous wash solution contained within a conventional washing machine, preferably during the wash cycle and optionally during the rinse cycle.

The Pre-treating Compositions

The pre-treating compositions of the present invention comprise an effective amount of one or more soil release agents and optionally, but preferably, one or more other benefit agents, preferably selected from the group comprising one or more spreading agents or surfactants, odor control agents, perfume agents, disinfecting agents (e.g., anti-bacterial agents), and anti-fungal agents.

The pre-treating compositions can be formulated to be applied to "new" shoes (i.e., new and/or little worn or little soiled shoes) for preventative and/or comfort reasons. For example, a consumer may desire to treat such "new" shoes with a pre-treating composition comprising conditioning agents and/or soil release agents and/or odor control agents, or other benefit agents prior to wearing the shoes. The compositions containing the benefit agents and other optional ingredients are preferably at a level that is effective, yet is not discernible when dried on the shoes.

It is desirable that the soil release agents and other benefit agent(s) be present in the pre-treating compositions of the present invention in an amount in the range of from about 0.01% to about 90% by weight of the pre-treating composition, more preferably from about 0.1% to about 80%, even more preferably from about 0.5% to about 70% by weight of the pre-treating composition. Although, for some embodiments of the pre-treating compositions of the present invention, the benefit agent may be present in the pre-treating compositions from about 90% to about 100% by weight of the pre-treating composition. Furthermore, it is desirable that the benefit agents are present in the wash, rinse, soaking, and/or spray-treatment solution in an amount of from about 2 ppm to about 100,000 ppm, more preferably from about 10 ppm to about 25,000 ppm.

The compositions described herein including, but not limited to the pre-treatment composition, and the cleaning and/or conditioning compositions, preferably have certain desirable properties. Preferably, the compositions are essentially free of polyphosphates, especially phosphates in the group consisting of sodium pyrophosphate, sodium tripolyphosphate, and mixtures thereof. Preferably, the compositions comprise less than about 5%, more preferably less than about 4%, even more preferably less than about 3%, still even more preferably less than about 2%, yet still even more preferably less than about 1%, and most preferably about 0% by weight polyphosphates.

Preferably, when the compositions are used for treating shoes with natural leather-containing surfaces, the compositions are essentially free of bleaching systems, especially types of bleaching agents and/or levels of bleaching agents, especially chlorine bleach, that would do more damage to the shoes than provide benefit to the shoes. The compositions may also comprise a bleach scavenger. Preferably, the compositions of the present invention are also essentially free of material that would soil or stain the shoes.

In addition, when the compositions are used for treating shoes with natural leather-containing surfaces, the compositions preferably have reduced levels of other substances therein that are harmful to such surfaces. For example, Calcium/Magnesium (Ca/Mg) removal agents (many of which are referred to as "builders") are often used in aqueous cleaning systems to remove the Ca and Mg divalent ions normally present in both soils and water. Removal of these two divalent ions by the Ca/Mg removal agents can in many instances greatly enhance the performance of cleaning and/or detergent systems. This is especially true for the removal of particulate soils such as the clay, dirt, mud, and also grass soils often encountered with shoes, especially athletic shoes. Thus, the presence of Ca/Mg removal agents is especially useful for the removal of particulate soils such as the clay, dirt, mud, and grass soils often encountered with such shoes.

Some of the same Ca/Mg removal agents useful in removing the Ca/Mg divalent ions may also very effectively bind or remove transition metal ions. The specific agents binding transition metal ions are often referred to in the literature as chelants and the process of their binding transition metal ions as chelation. The presence of chelants is normally not a significant problem for conventional detergents as the removal of low levels of transition metal ions usually does not hurt and indeed may actually improve the observed cleaning performance.

However, for leather-containing shoes, the use of transition metal ion chelating agent-containing treating compositions poses an unexpected and previously unrecognized problem for the formulation of cleaning systems for the aqueous washing of shoes. The leather portion of the shoes may be adversely affected by the transition metal ion chelating agents by removing the transition metal Chromium from the leather in the shoes. Chromium is the predominant tanning material used in leather for shoes and it imparts significant added strength and temperature resistance to the leather. Thus, the removal of Chromium by the compositions is highly undesirable. Thus, it is highly desirable that a composition and/or method be devised that deliver an effective level of Ca/Mg removal agent to the washing of leather-containing shoes without removing significant levels of Chromium.

Accordingly, it is desirable that the Ca/Mg removal agents used in the compositions are preferably selected so that those Ca/Mg removal agents with very high binding capabilities for Chromium are not used, yet the Ca/Mg removal agents used are still effective at binding Ca and Mg divalent ions when used as described herein. Preferably, the treating compositions are formulated so that they comprise no more than about 30%, more preferably no more than about 20%, even more preferably no more than about 10% by weight of the treating composition of chromium-binding agents that are capable of binding $Cr^{3+}$ with a log K binding constant of more than 12, more preferably more than 9, even more preferably more than 6.

The benefit agents in the treating composition(s) are preferably selected so as to minimize any damages to the shoes as a result of the washing process, and to avoid providing the shoes with any undesirable properties. Therefore, the benefit agents in these treating composition(s) (e.g., the pre-treating, cleaning and/or conditioning compositions) are preferably selected such that the ratio of the water absorption into an interior surface of the shoes treated by the treating composition to the water absorption into the interior surface of the shoes prior to treatment with the treating composition is greater than about 0.1, preferably greater than about 0.3. It is desirable that the benefit agents do not make the shoes slippery, particularly on the insides. The benefit agents are, therefore, preferably also selected so that the ratio of the friction between a surface of the shoes treated by the treating composition and a second surface, to the friction between the surface of the shoes prior to treatment with the treating composition and the second surface is greater than about 0.7, preferably greater than about 0.8, more preferably greater than about 0.9.

Preferred Pre-treatment System Benefit Agents

The pre-treating compositions of the present invention comprise an effective amount of one or more benefit agents, such as soil release agents and spreading agents (or surfactants).

a. Release (Soil Release) Agents

The soil release agents used in the pre-treatment system are preferably polymeric. Preferred polymeric soil release agents are polysaccharides. The polysaccharides can have any suitable molecular weight (MW). In certain embodiments, the polysaccharides may have a molecular weight of less than about 1,000,000, or less than about 500,000, or less than about 250,000.

In one non-limiting embodiment, substances that can be used as the release agents in the pre-treating compositions described herein are water soluble modified celluloses which include, but are not limited to: carboxymethylcellulose, hydroxypropylcellulose, methylcellulose, and like compounds. These compounds, and other suitable compounds, are described in Kirk Othmer Encyclopedia of Chemical Technology, $4^{th}$ Edition, vol. 5, pages 541–563, under the heading of "Cellulose Ethers", and in the references cited therein.

These substances are especially effective for the purposes described herein when the treated shoe is thereafter washed in a solution containing a sufficient amount of an enzyme that without wishing to be bound to any particular theory, it believed to hydrolyse or otherwise degrade the modified celluloses. A suitable enzyme for this purpose is cellulase. Cellulase may be obtained from Novozyme of Denmark under the trade name of CAREZYME 900T, 4500T, 1000L, or 4500L, and CELLUZYME 0.7T, and DENIMAX L, PB, T, and DENIMAX Ultra BT, L, and NOVOZYME 342. While not wishing to be bound by any particular theory, it is believed that when the polymer is pre-treated onto the canvas substrate, it forms a protective barrier that prevents the soil from penetrating into and/or between the fibers of the canvas where it is comparatively more difficult to remove. The presence of the enzyme in the wash solution following soiling of the shoes is believed to help strip away the film, aiding in the release of the dirt from the fabric.

Other combinations of water soluble or water dispersible polymers and the appropriate enzymes may also be used to provide a similar benefit.

For example, in other non-limiting embodiments, the protective compositions are carbohydrate biopolymers and the removing substances are carbohydrases. Carbohydrate biopolymers with carbohydrases, include, but are not limited to: (1) celluloses and derivatives (such as CMC, HPC, HEC, methylcellulose) with cellulose degrading enzymes (such as cellulases, glucanohydrolyse, cellobiohydraolases, glucosidases) and mixtures thereof, (2) starches and derivatives (such as starch amyloses, starch amylopectins, starch dextrins, starch ethers, and modified starches) with starch degrading enzymes (such as $\alpha$-, $\beta$-, $\gamma$-amylases, glucanases, maltohdrolases, cyclodextrin-glycosyltransferases, pullulanases, neopullulanase, isoamylases, glucosidases, amyloglucosidases, transglucosidases) and mixtures thereof, (3) hemicelluloses and derivatives (such as xyloglucans, galactans, arabinans, glucans, xylans) with hemicellulases (such as xyloglucanases, galactanases, arabinases, glucanases, xylanases) and mixtures thereof; (4) pectins (HM and LM pectins) and derivatives with pectic enzymes (such as pectinesterases, pectin lyases, galacturonases, galacturonosidases, pectate lyases, galacturonate lyases) and mixtures thereof; (5) natural gums and derivatives (such as guar, Locus Bean, Tamarind, and other seed gums, agar, carragreenan, algin, gellan, furcellaran, and other seaweed extracts, arabic, tragacanth, and other plant exudates, arabinogalactan and other plant extracts, chitin, chitosan, and extracts from other animal/living organisms) with gum degrading enzymes (such as manannases, mannosidases, rhamnosidases, galactanases, and other hemicellulases, lysozymes, trehalases, glucosidases, aminidases, chitinases, sulphatases) and mixtures thereof; (6) biosynthetic gums and derivatives (such as xanthan, dextrans) with specific saccharide degrading enzymes (such as xanthan degrading enzymes, dextranases, glucanases, fructanases, isomerases, odicases, glucose dehydrogeneases) and mixtures thereof; and (7) glycopolymers (such as polysaccharides, glycoproteins, proteoglycans, glycosaminoglycans, glycolipids) and glycopolymer degrading enzymes (such as polysacchride hydrolases and lyases, glycoside hydrolases, linkage hydrolases, functional group-specific enzymes) and mixtures therof.

In other embodiments, the protective compositions can comprise polypeptide biopolymers and the removing substances can be proteases. In other embodiments, the protective compositions are polyester polymers and the removing substances are lipases, esterases, and/or polyesterases. In addition to the combinations of substances enumerated herein, any other substances that have the characteristics described herein may also be used. Of course, any of the protective compositions and removing substances described herein can also be used in any suitable combinations.

If utilized in a spray-on pre-treatment, soil release agents will generally comprise from about 0.01%, preferably from about 0.1%, more preferably from about 0.2% to about 10%, preferably to about 5%, more preferably to about 3% by weight, of the composition. The rest of the composition is comprised of water and other benefit agents including, but not limited to surfactants, ethanol, preservatives, and odor control agents.

However, the pre-treating compositions of the present invention, in certain embodiments, such as when the shoes are treated with the compositions by applying the compositions during the rinse cycle of a machine washing process, may comprise more concentrated levels of release agents, such as in the amount of from about 5% to about 100%, more preferably from about 10% to about 95%, even more preferably from about 20% to about 90% by weight of the composition. This will provide an acceptable level of the soil release agent(s) even when the compositions are diluted with water during the rinse process.

Other nonlimiting examples of suitable soil release polymers are disclosed in: U.S. Pat. Nos. 5,728,671; 5,691,298; 5,599,782; 5,415,807; 5,182,043; 4,956,447; 4,976,879; 4,968,451; 4,925,577; 4,861,512; 4,877,896; 4,771,730; 4,711,730; 4,721,580; 4,000,093; 3,959,230; and 3,893,929; and European Patent Application 0 219 048. Further suitable soil release agents are described in U.S. Pat. Nos. 4,201,824; 4,240,918; 4,525,524; 4,579,681; 4,220,918; and 4,787,989; EP 279,134 A; EP 457,205 A; and DE 2,335,044.

Additionally, further examples of suitable soil release agents and their application are discussed in detail in the following references:

"Powdered Detergents", edited by Michael S. Showell, Chapter 7 by Eugene P. Gosselink entitled "Soil Release Agents in Powdered Detergents", 1998, Marcel Dekker (New York) and references therein.

Kirk Othmer Encyclopedia of Chemical Technology, 4$^{th}$ Edition, vol.21, Chapter on Release Agents, starting on page 207 and references cited therein.

Kirk Othmer Encyclopedia of Chemical Technology, 4$^{th}$ Edition, vol. 25, Chapter on waterproofing and water/oil repellency, starting on page 595 and references cited therein.

Encyclopedia of Polymer Science and Engineering, Mark, H. F.; Kroschwitz, Jacqueline I., 2nd ed. New York: Wiley, 1985 and references cited therein.

Another category of suitable release agents comprise phospholipids, such as lecithin. The term "lecithin" can be used to describe both the pure phosphatidyl choline and mixtures of the phosphatidyl choline with other phospholipids, triglycerides, etc. However, aqueous dispersions of lecithin preferably have a buffer to maintain a near neutral pH. This reduces the extent or likelihood of hydrolysis of the lecithins which could result in a loss of efficacy. Compositions with lecithin that are exposed to air preferably contain an antioxidant to reduce the potential degradation of the lecithin. Aqueous dispersions of lecithin will require the presence of an antimicrobial preservative.

The soil release agents can also comprise combinations of the different soil release agents described herein. The different soil release agents can be mixed together and applied to the shoes, or they can be applied to the shoes in successive steps. The soil release agents, instead of comprising a mixture of different soil release agents, can also comprise a single type of soil release agent, which is provided in different molecular weights, which are mixed together. Such combinations of the different soil release agents can be useful to provide the shoes with single or multiple protective layers, for example, and for other purposes.

b. Spreading Agents or Surfactants

A wide range of spreading agents or surfactants can be used in the pre-treating compositions of the present invention. They are useful in several regards. First, they reduce the tendency for the composition to bead up and fail to spread on the surfaces of the shoes. Second, they can aid in the subsequent cleaning of the shoes. Third, they useful in a heretofore unanticipated problem that can occur during the application of release agents to the multiple surfaces encountered in shoes. The unanticipated problem is the appearance of unseemly spotting when some release agents are deposited on some surfaces; e.g., dark or black leather shoe surfaces. Thus, the inclusion of a surfactant in spray containing carboxymethylcellulose will alleviate the spots on leather while maintaining or enhancing the benefit of the carboxymethylcellulose.

Surfactants included in the pre-treating compositions of the present invention can comprise at least about 0.01%, preferably at least about 0.1%, more preferably at least about 1%, to about 80%, more preferably to about 60%, most preferably to about 50% by weight of pre-treating composition depending upon the particular surfactants used and the desired effects to be achieved. Care should be taken that any introduction of surfactant into the rinse does not cause excess sudsing in the rinse. Methods for doing this are well known to those of ordinary skill in the art.

The surfactant(s) can be nonionic, anionic, ampholytic, amphophilic, zwitterionic, cationic, semi-polar nonionic, and mixtures thereof, nonlimiting examples of which are disclosed in U.S. Pat. Nos. 5,707,950 and 5,576,282. A typical listing of anionic, nonionic, ampholytic and zwitterionic classes, and species of these surfactants, is given in U.S. Pat. No. 3,664,961 issued to Norris on May 23, 1972. Preferred pre-treating compositions comprise nonionic surfactants and/or mixtures of nonionic surfactants with other surfactants, especially anionic surfactants.

Nonlimiting examples of surfactants useful herein include the conventional $C_8$–$C_{18}$ alkyl ethoxylates ("AE"), with ethylene oxide ("EO") of about 1–22, including the so-called narrow peaked alkyl ethoxylates and $C_6$–$C_{12}$ alkyl phenol alkoxylates (especially ethoxylates and mixed ethoxy/propoxy), alkyl dialkyl amine oxide, alkanoyl glucose amide, $C_{11}$-$C_{18}$ alkyl benzene sulfonates and primary, secondary and random alkyl sulfates, the $C_{10}$–$C_{18}$ alkyl alkoxy sulfates, the $C_{10}$–$C_{18}$ alkyl polyglycosides and their corresponding sulfated polyglycosides, $C_{12}$–$C_{18}$ alpha-sulfonated fatty acid esters, $C_{12}$–$C_{18}$ alkyl and alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like. Other conventional useful surfactants are listed in standard texts. In one nonlimiting embodiment, a surfactant suitable for use with carboxymethylcellulose comprises a nonionic $C_8$–$C_{18}$ alkyl ethoxylate surfactant with an EO of about 1–22 such as NEODOL 23–9 available from the Shell Chemical Company. In one version of this embodiment, such a surfactant can be provided in a concentration of from about 0.1% to about 5%.

The compositions described herein may also include an effective amount of one or more other benefit agents including, but not limited to: dispersants and/or anti-redeposition agents; odor control agents; perfumes; drying agents; disinfecting agents, antimicrobial actives and/or preservatives, and mixtures thereof; or other benefit agents or auxilliary components. Other types of benefit agents or auxiliary components, include, but are not limited to: antioxidants, chelating agents, e.g., aminocarboxylate chelating agents, heavy metal chelating agents, colorants, brighteners, suds suppressors, dye transfer inhibiting agents, enzymes, enzyme stabilizers, organic solvents, pH and buffering agents, film-forming polymers, other components, and mixtures thereof. Examples of such adjuncts are generally described in U.S. Pat. No. 5,576,282.

The compositions described herein can have additional benefit agents (such as drying agents allowing for faster drying when the pre-treatment contains a substantial proportion of water) provided therein, or such additional benefit agents may be provided in separate compositions. In one non-limiting example, the pre-treatment composition is in the form of a spray that can be applied to the inside of the shoes, the outside of the shoes, or both, which comprises ethanol to provide a quick drying disinfectant. In such an embodiment, the ethanol may be present in amounts greater than the weight percentage of the other benefit agents. For example, ethanol may be present in such a composition in amounts greater than or equal to about 30% by weight, or any percentage which is a multiple of 5 greater than 30%, including, but not limited to greater than or equal to about 50% by weight.

The pre-treating compositions of the present invention can be in any suitable form, including but not limited to solid (powder, granules, bars, tablets), dimple tablets, liquid, paste, gel, spray, aerosol, stick or foam forms and mixtures thereof. When the pre-treating compositions are liquids and/or gels, they can be in "concentrated form", in such case, the liquid pre-treating compositions according to the present invention will contain a lower amount of water, compared to conventional liquid detergents. The water content of the concentrated liquid pre-treating compositions may be less than or equal to about 50% by weight of the pre-treating compositions.

Methods of Treating and Cleaning and Conditioning Shoes

Preferred Methods for Applying the Pre-treating Compositions

The pre-treating compositions may be applied to the shoes in any suitable manner. The pre-treating compositions may be applied in conjunction with a washing process and/or rinsing process and/or separately apart from a washing procedure.

In one non-limiting embodiment, the pre-treatment compositions of the present invention can be applied by spraying a liquid pre-treatment composition onto the shoes in which the shoes are being treating separately from a typical machine washing process. The spray pre-treatment compositions in such an embodiment will typically be packaged in spray dispensers. The spray dispensers can be any of the manually activated means for producing a spray of liquid droplets as is known in the art, e.g. trigger-type, pump-type, non-aerosol self-pressurized, and aerosol-type spray means. In general, the spray process is preferred when a high level of active ingredients needs to be delivered to the shoes since there will be no dilution of the active ingredients in a wash or rinse procedure. This method provides good performance since relatively high concentrations of the benefit agents can be applied directly to the shoes. While this approach has this advantage, however, it does require the consumer to treat the shoe outside of the normal laundering process and thus may not be as convenient as a process that is part of a washing process.

In another non-limiting embodiment, the pre-treatment compositions can be applied to the shoes through (or during) the wash or rinse cycle in a washing machine. This may be preferred among consumers for its convenience. When the pre-treatment composition is applied during the wash or rinse cycle nothing needs to be sprayed onto the shoes, and the shoes do not need to be handled apart from what is necessary to wash them in a washing machine. It is, however, more difficult to apply a relatively high quantity of pre-treatment composition to shoes using a through a wash or rinse process due to dilution of the pre-treatment composition in the wash or rinse water. In general, the rinse is preferred over the wash process since the benefit agents can be rinsed off in the rinse if they are delivered in the wash. In this embodiment, the pre-treatment composition can be added to the wash or rinse water in the form of a concentrated liquid, solid, or gel. If the pre-treating system is delivered in the wash or rinse, it is preferred that it be formulated such that quickly dissolves or disperses prior to the end of either cycle. Methods of formulating compositions in such a manner are well known to those skilled in the art.

In other embodiments, the pre-treatment compositions can be applied by painting or rolling the same onto the shoes using a variety of techniques, including but not limited by the use of brushes, paint rollers or the like. Such techniques can be carried out manually, or with machines.

Methods for Cleaning and Conditioning Shoes

The methods for pre-treating the shoes can be used alone or as a part of an overall process of caring for the shoes. The pre-treating compositions are preferably used in conjunction with processes for cleaning and conditioning the shoes, and are a part of such processes.

The pre-treating compositions of the present invention are optionally, but preferably used with certain cleaning and/or conditioning systems such that the optimum in both the cleaning of canvas/fabric containing shoes and the care of leather containing shoes is achieved. Preferably, the shoes are worn after the pre-treating composition is applied and the wearing (and soiling) of the shoes is followed by use of a cleaning and/or conditioning composition. This may provide a benefit that is greatly enhanced over that provided by any of these treatments alone. Preferred compositions and systems for cleaning and/or conditioning the shoes in conjunction with the pre-treating process described herein are described in greater detail herein and in U.S. patent application Ser. No. 09/693,224 filed on Oct. 20, 2000, which is incorporated herein by reference.

The cleaning and/or conditioning compositions can also be modified as described herein to form new compositions which are even more suitable for use with the pre-treating compositions of the present invention. For example, a pre-treatment active ingredient such as CMC that can be hydrolyzed by an enzyme (cellulase) in the the cleaning composition followed by washing the shoe with the cleaning composition containing the appropriate enzyme.

The Cleaning and/or Conditioning Compositions

The cleaning and/or conditioning compositions may be referred to herein generically as "treating composition(s)". The treating composition(s) comprise one or more benefit agents that impart one or more desired benefits to the shoes when the treating composition(s) are applied directly or indirectly to the shoes. The treating composition(s) can be applied to the shoes prior to and/or during and/or after washing the treated shoes with or in an aqueous medium. The treating composition(s) are preferably formulated so that any damage as a result of washing the shoes with or in an aqueous medium containing the treating composition(s) is reduced compared to washing the shoes with or in an aqueous medium free of the treating composition(s).

The treating composition(s) can be in a variety of forms, including, but not limited to gels, liquids, solids, pastes, foams, sprays, aerosols, bars and mixtures thereof. The treating composition(s) preferably have a pH, as determined in a 10% aqueous solution of the neat treating composition, in the range of from about 2.5 to about 11, or from about 5 to about 10, or from about 6 to about 9.

The one or more benefit agents in the treating composition (s) are preferably selected from the group which includes, but is not limited to: cleaning agents, conditioning agents, disinfecting agents, antibacterial agents, antimicrobial agents, antifungal agents, odor control agents, waterproofing agents, soil release agents, brightening agents, alkaline pH modifiers, perfume, and mixtures thereof.

The treating composition(s) can be provided in the form of cleaning compositions having cleaning agents therein, and/or conditioning compositions having conditioning agents therein, or in the form of two-in-one cleaning and conditioning compositions.

Preferably, if the treating compositions(s) comprise cleaning compositions, the cleaning agents therein are selected from the group which includes, but is not limited to the following benefit agents, one or more: surfactants, calcium/magnesium removal agents, alkaline pH modifiers, soil release agents, enzymes, and mixtures thereof.

The surfactants that are used in the cleaning compositions may be selected from the group including, but not limited to one or more: anionic, nonionic, cationic, zwitterionic, and amphophilic surfactants and mixtures thereof. If the surfactants comprise nonionic surfactants, at least some of the one or more surfactants can comprise $C_8$–$C_{18}$ alkyl ethoxylates, with an average degree of ethoxylation from about 5 to about 15 moles of ethylene oxide per mole of alcohol. The cleaning compositions may contain from about 1% to about 80% by weight of nonionic surfactant. The cleaning composition(s) preferably have a pH, as determined in a 10% aqueous solution of the neat cleaning composition, in the range of from about 5 to about 11, more preferably from about about 6 to about 10, and most preferably from about 7 to about 10. The cleaning compositions can be in any suitable form specified above for the "treating composition (s)". In one embodiment, the cleaning composition is in the form of a gel.

The calcium/magnesium removal agents that are used in the cleaning compositions may be selected from a group which includes, but is not limited to: polycarboxylates, polyacrylates, salts of polyacrylic acids, acrylate/maleate copolymers, salts of acrylate/maleic acid copolymers, citrates, ether polycarboxylates, oxydisuccinate, polyaspartates, polyglycolates and mixtures thereof. When the calcium/magnesium removal agents comprise polyacrylates, salts of polyacrylic acids, acrylate/maleate copolymers, salts of acrylate/maleic acid copolymers and mixtures thereof, the average molecular weight of these calcium/magnesium removal agents is preferably greater than about 500 and less than about 100,000.

The treating composition(s) can, as noted above, also comprise conditioning compositions. The conditioning compositions can comprise conditioning agents that are selected from the group which includes, but is not limited to: acrylic syntans and other hydrophobically modified polymers, silicones, fluorocarbons, fatliquors, lecithin, fluoropolymers, sucrose polyesters, quaternary ammonium salts, oils, waxes and mixtures thereof. If the conditioning agents comprise acrylic syntans, they are preferably selected from acrylic syntans having the formula:

wherein R is independently $C_8$–$C_{20}$ alkyl, and X and Y are independent integers, and the ratio of X/Y is from about 0.05 to about 100.

The conditioning agents may also comprise one or more hydrophilic units and one or more hydrophobic units such that the ratio of hydrophilic units to hydrophobic units is from about 0.01 to about 100.

The conditioning compositions preferably have a pH, as determined in a 10% aqueous solution of the neat conditioning composition, that is in the range of from about 2.5 to about 9, more preferably from about 3 to about 8, most preferably from about 3.5 to about 7. The conditioning compositions can be in any suitable form specified above. In one embodiment, the cleaning composition is in the form of a liquid.

The treating composition(s) can, as noted above, comprise one or more disinfecting agents. Suitable disinfecting agents include, but are not limited to: quaternary ammonium salts, saturated and unsaturated $C_8$ to $C_{11}$ fatty acids, phenols and their salts, o-phenyl phenol and its salts, t-amyl phenol and its salts, alkyl phenols and their salts, trichlocarbanilide, 4-chloro-3,5-dimethylphenol and its salts, chlorhexidine, hospholipids, thymol, euegnol, geraniol, oil of lemon grass, limonene, and mixtures thereof. When the disinfecting agent at least partially comprises a $C_8$–$C_{10}$ fatty acid, it is preferably used at a pH less than about 5.5. The disinfecting agent may also comprise: (1) benzalkonium chlorides and/or substituted benzalkonium chlorides; (2) dialkyl quaternary; (3) N-(3-chloroallyl) hexaminium chlorides; (4) benzethonium chloride; (5) methylbenzethonium chloride; (6) cetylpyridinium chloride. Other suitable disinfecting agents include: chlorhexidene and its salts, or polyhexamethylene biguanide hydrochloride and its salts. Still other suitable disinfecting agents include tetraacetyl ethylene diamine (TAED), benzoylcaprolactam (BzCL), 4-nitrobenzoylcaprolactam, 3-chlorobenzoylcaprolactam, benzoyloxybenzenesulphonate (BOBS), nonanoyloxybenzenesulphonate (NOBS), decanoyloxybenzenesulphonate ($C_{10}$-OBS), benzoylvalerolactam (BZVL), octanoyloxybenzenesulphonate ($C_8$-OBS), 4-[N-(nonanoyl) amino hexanoyloxy]-benzene sulfonate sodium salt (NACA-OBS), dodecanoyloxybenzenesulphonate (LOBS or $C_{12}$-OBS), 10-undecenoyloxybenzenesulfonate (UDOBS or $C_{11}$-OBS with unsaturation in the 10 position), and decanoyloxybenzoic acid (DOBA) wherein a peroxygen source is added to the bleach activator such that the mole ratio of peroxygen bleaching compound (as AvO) to bleach activator in the present invention is at least about 1:1. Still other disinfecting agents include preformed peracids including: phthalimidoperoxy-caproic acid; nononylamide of either peroxysuccinic acid or peroxyadic acid: N,N'-terephthaloyl-de(6-aminoperoxycaproic acid); N-lauroyl-6-aminoperoxycaproic acid; N-decanoyl-aminoperoxycaproic acid; N-nonanoyl-6-aminoperoxycaproic acid; and 6-decylamino-6-oxoperoxycaproic acid.

As discussed above, the compositions for treating the shoes can comprise a first depositing protective substance (such as the "pre-treating composition") that is used in conjunction with a second removing substance. Without wishing to be bound to any particular theory, is believed that the first depositing protective substance forms a protective deposit or barrier on at least portions of the shoes, and the second removing composition is capable of removing the first substance and at least some of the soil deposited on the first protective substance from the shoes.

Suitable removing substances include, but are not limited to enzymes. Examples of enzymes that can be used are cellulases and proteases. The enzymes can be added to the compositions in any suitable manner, including but not limited to in the following forms: lyophilized, granulated, liquid (e.g., fermentation broth, lysed cells, supernatant), and also in encapsulated, or immobilized forms. The enzymes can be purified enzymes, crystallized, wild type, or even present in microorganisms. The enzymes can be added in the form of compositions that include enzyme stabilizers and reversible inhibitors. The enzymes can be provided in any suitable concentrations. For example, in certain non-limiting embodiments, the enzymes can be present in the product in concentrations of between about 0.001% (or 0.01%, or 0.05%) to about 20%. The enzymes can be provided in the wash solution in amounts varying from about 0.01 ppm to about 100 ppm. Preferably, when used in a composition applied during a machine washing/rinsing process, the enzymes are provided in concentrations of less than about 30 ppm (e.g., 1 ppm).

Numerous other examples of combinations of protective compositions and removing substances are possible. In one non-limiting set of embodiments, the protective compositions are carbohydrate biopolymers and the removing substances are carbohydrates. In another set of embodiments, the protective compositions are polypeptide biopolymers and the removing substances are proteases. In another set of embodiments, the protective compositions are polyester polymers and the removing substances are lipases/esterases/polyesterases. The compositions used herein can also comprise mixtures of the different removing substances such as those specified herein, for example to remove multiple layers of different protective substances.

The cleaning and/or conditioning composition, or both, may contain the removing substance, e.g., the enzyme, the carbohydrases, the proteases, or the lipases/esterases/polyesterases. The use of the pre-treatment composition prior to the wear of the shoes, and subsequent treatment with cleaning and/or conditioning compositions containing the removing substance(s) preferably produces a benefit greater than cleaning and/or conditioning alone without the pre-treatment step.

The compositions described herein can have additional benefit agents provided therein, or such additional benefit agents may be provided in separate compositions. The additional benefit agents include, but are not limited to: (such as antimicrobial agents, odor control agents, spreading agents, alkaline pH modifiers, anti-foaming agents, brighteners, perfumes, and drying agents. The benefit agents will depend, to at least some extent, on when and how the treating composition is intended to be used. For example, the treating composition(s) can be applied to the shoes after washing the shoes. A post wash treating composition can include benefit agents such as: soil release agents, water-proofing agents, and mixtures thereof. Typically, a water-proofing agent would not be applied before the shoes are washed, otherwise, it may interfere with the washing process.

When the treating composition comprises a brightening agent, the brightening agent may be deposited on leather and/or the midsoles of shoes as evidenced by solution depletion of about 1% or greater without visible brightener staining. Suitable brightening agents include, but are not limited to brightening agents selected from the group consisting of: coumarin derivative brighteners; oxazole brighteners; and benzoxazolyl brighteners.

The treating composition can comprise a perfume to provide a "scent signal" in the form of a pleasant odor which provides a freshness impression to the treated shoes. The scent signal can be designed to provide a fleeting perfume scent, or a more intense odor in the product and on the shoes. It may be desirable for the perfume to comprise at least about 25% of substantive perfume ingredients, by weight of the perfume composition. Substantive perfume ingredients are characterized by their boiling points (B.P.) and ClogP value. When a perfume composition is comprised of substantive perfume ingredients having a B.P. or about 250° C. or higher, and a ClogP of about 3.0 or higher, they are very effectively deposited on shoes, and remain substantive on shoes after the steps for treating the shoes described herein are performed.

The cleaning compositions and/or conditioning compositions can be used individually, or together. If used together, they can be in the form of a cleaning and conditioning system. The cleaning and conditioning compositions can be separated physically and/or chemically, or they can be combined together. In one non-limiting embodiment, the cleaning and conditioning compositions can be separate compositions in which the cleaning composition is applied to the exterior surfaces of the shoes, and the conditioning composition is applied to the interior surfaces of the shoes. In other embodiments, the cleaning and conditioning compositions can be combined into a single "two-in-one" cleaning and conditioning composition.

When the cleaning and conditioning compositions are separated, the cleaning composition can have a pH that is greater than the pH of the conditioning composition. For example, the cleaning composition can have a pH, as determined in a 10% aqueous solution of the neat cleaning composition, that is that is in the range of from about 5 to about 11, and the conditioning composition can have a pH, as determined in a 10% aqueous solution of the neat conditioning composition, that is that is in the range of from about 2.5 to about 9.

The compositions described herein can be suitably prepared by any process chosen by the formulator, non-limiting examples of which are described in U.S. Pat. Nos. 5,576,282; 5,691,297 Nassano et al., issued Nov. 11, 1997; U.S. Pat. No. 5,574,005 Welch et al., issued Nov. 12, 1996; U.S. Pat. No. 5,569,645 Dinniwell et al., issued Oct. 29, 1996; U.S. Pat. No. 5,565,422 Del Greco et al., issued Oct. 15, 1996; U.S. Pat. No. 5,516,448 Capeci et al., issued May 14, 1996; U.S. Pat. No. 5,489,392 Capeci et al., issued Feb. 6, 1996; U.S. Pat. No. 5,486,303 Capeci et al., issued Jan. 23, 1996 all of which are incorporated herein by reference.

Use of the Compositions in Methods of Treating Shoes

In general, the methods for treating shoes comprise contacting the shoes directly or indirectly with one or more treating compositions, each of which comprises one or more benefit agents that imparts one or more desired benefits to the shoes when the treating composition is applied directly or indirectly to the shoes. The treating composition(s) are preferably applied: to one or more interior surfaces of the one or more shoes; to one or more exterior surfaces of the one or more shoes; or both. If desired, the benefit agents may be selected so that, one or more of the desired benefits (e.g., conditioning) imparted to the one or more shoes endures washing of the one or more shoes.

The treating composition(s) can be applied prior to and/or during and/or after washing the treated shoes with or in an aqueous medium. The shoes can be washed with or in an aqueous medium in any suitable manner, such as submerging, partially or completely, the shoes in a washtub or other receptacle, such as a sink, or the like, spraying the shoes with water from a garden hose, faucet, or the like, allowing rain drops to contact the shoes, submerging the shoes partially or completely in a body of water, such as a river, lake or pond, and submerging the shoes in an aqueous wash solution contained within a conventional washing machine.

In one non-limiting embodiment, the method cleans, deodorizes, and conditions canvas and/or leather-containing athletic shoes in a conventional home washing machine. The cleaning system comprises a liquid conditioner for mitigating the effects on leather shoe surfaces as a result of washing the shoes in an aqueous medium, and a cleaning gel for cleaning the outside of the shoes. The treating compositions may be applied directly to the exterior surfaces of the shoes, the interior surfaces of the shoes and/or both, preferably by using an applicator if desired. Rubbing of the treating composition onto the surfaces of the shoe may expedite treatment of the surfaces of the shoes.

In this embodiment, the cleaning gel is applied to the outside of the shoes directly from a brush applicator on top of the cleaning gel bottle. The liquid conditioner is poured inside the shoe through the opening in the shoe (in which the wearer's foot is inserted), and the shoe is rocked back and forth to distribute the conditioner.

To prevent damage to the shoes in the washing machine, the shoes are preferably placed in a flexible container for placement into the washing machine. Suitable flexible containers can be provided in any number of configurations, and is conveniently in the form of a flexible pouch or "bag", which has sufficient volume to contain the one or more shoes to be treated. The flexible container can be of any convenient size, and should be sufficiently large to allow movement of the container and shoe(s) contained therein, such as during agitation by hand and/or by a mechanical agitator in a conventional automatic washing machine, but should not be so large as to interfere with the operation of the mechanical agitator. Suitable containers may be manufactured from any economical material, such as polyester, polypropylene, and the like, with the proviso that it must not tear during agitation, either by hand or by a mechanical agitator.

Figure 1:
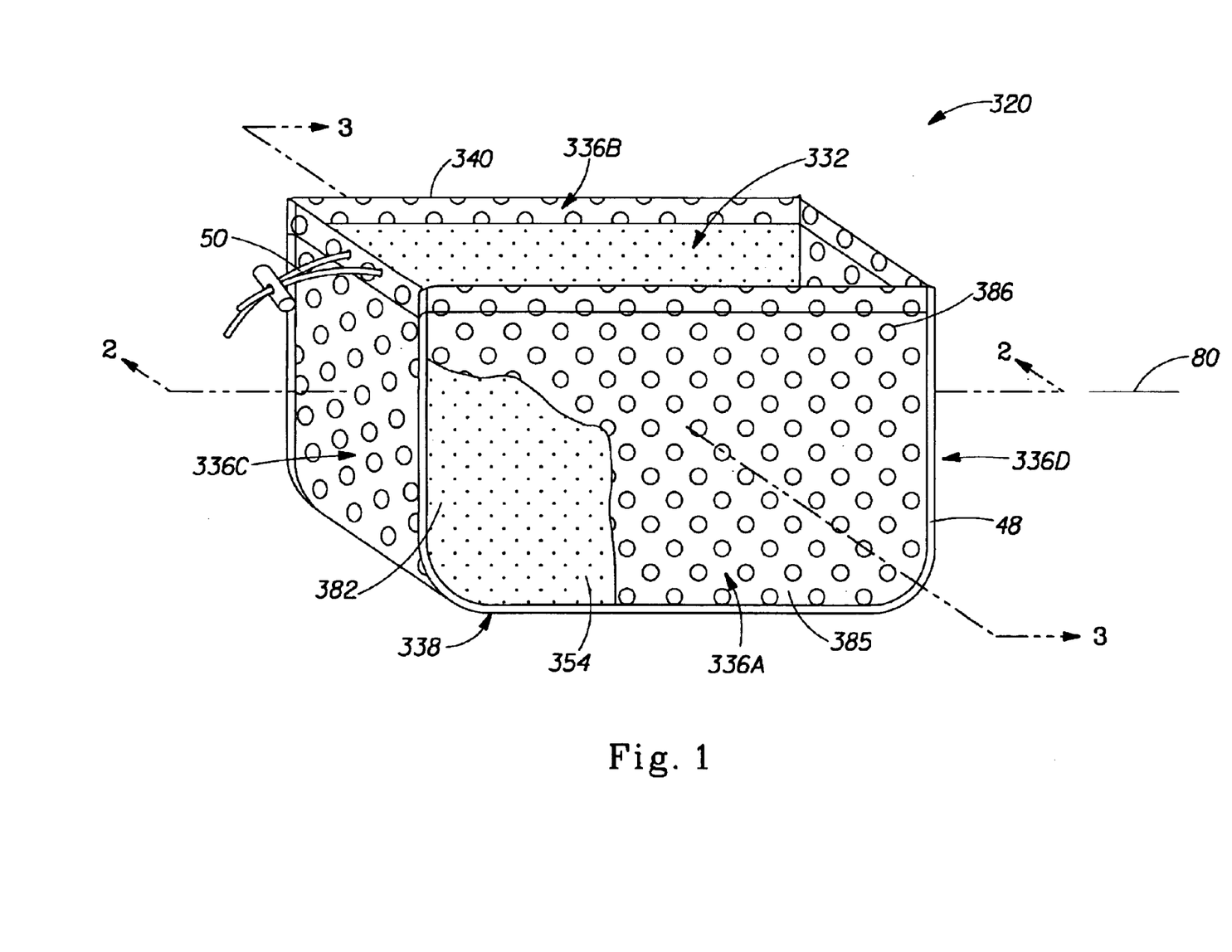
FIG. 1 is a perspective view of one non-limiting embodiment of a shoe bag which can be used when washing the shoes during the method of the present invention, wherein the longitudinal side walls comprise two panels and the transverse side walls comprise a single panel and wherein a portion of one of the longitudinal side walls has been removed to expose the other panel.
Figure 2:
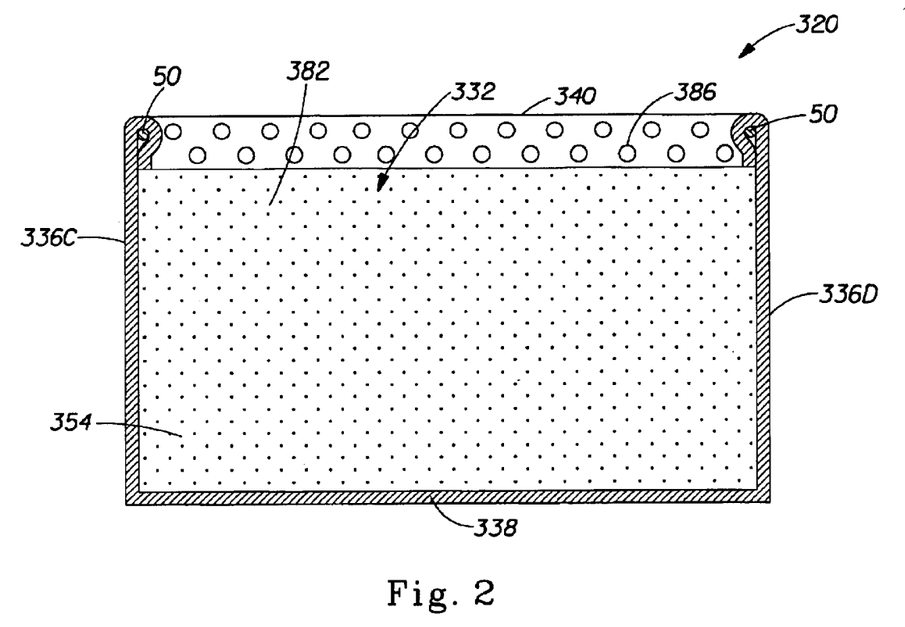
FIG. 2 is a cross-sectional side view of the shoe bag of FIG. 1, taken along line 2—2 thereof.
Figure 3:
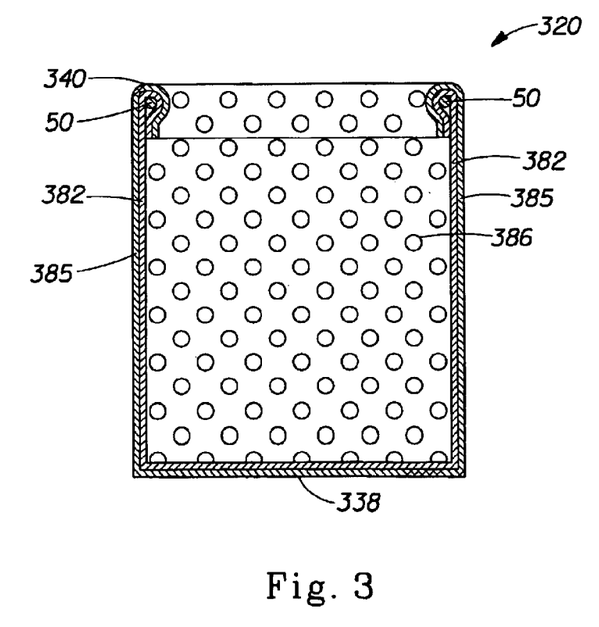
FIG. 3 is a cross-sectional side view of the shoe bag of FIG. 1, taken along line 3—3 thereof.

FIGS. 1–3 show one non-limiting embodiment of a shoe bag 320 for containing the shoes. In this embodiment, the shoe bag 320 preferably has a generally a parallelpiped shape. The shoe bag 320 comprises longitudinal side walls 336A and 336B whose longest dimension extends along the longitudinal axis 80 of the shoe bag 320 and transverse side walls 336C and 336D which are disposed transverse to the longitudinal axis 80 of the shoe bag 320. The side walls are interconnected with a bottom wall 338, preferably by stitching or seams 48, to form a compartment 332 having an opening opposite the bottom wall 338 through which a shoe can be inserted during use. The opening is defined by the top edges 340 of each of the side walls.

The longitudinal side walls 336A and 336B, in this embodiment are formed from a first panel 382 of a first apertured or mesh material while the transverse side walls 336C and 336D and the bottom wall 338 are formed from a single panel of a second apertured or mesh material which is distinct from the first mesh material. More preferably, the longitudinal side walls 336A and 336B further include a second panel 385 disposed adjacent the first panel 382 and which is also formed from the same second mesh material as the transverse side walls 336C and 336D. Thus, the first panel 382 forms the interior surface (i.e., the surface adjacent the compartment 332) of the longitudinal side walls while the second panel 385 forms the exterior surface of the longitudinal side walls. While for sake of clarity the second panel 385 will be discussed herein as formed from the same material (i.e., the second mesh material) which also forms the transverse side walls 336C and 336D, it is contemplated that that the second panel 385 can be formed from other materials, such as the first mesh material or some other woven or non-woven fabric. In addition, the longitudinal side walls 336A and 336B can be provided with more than two panels, if desired, or the transverse side walls 336C and 336D and/or the bottom wall 338 can be formed from a plurality of panels while the longitudinal side walls 336A and 336B are formed from a single panel.

Further, while each of the panels of the side walls is described herein as comprising a single uniform or homogenous fabric, it is contemplated that one or more of the panels might be formed from a plurality of fabrics. For example, the first panel 382 might be formed from both the first and second mesh materials or the first panel 382 might be formed from the first mesh material and another material. For multi panel side walls, the panels are preferably attached to each other about the periphery of the panels (e.g., at the seams or stitching 48) so that the panels are separated by a gap therebetween thereby allowing the panels to move relative to each other.

Preferably, the first mesh material of the first panels 382 of the longitudinal side walls has a plurality of apertures 354 which are smaller in size than the apertures 386 of the second mesh material of the transverse side walls 336C and 336D and the bottom wall 338. The apertures of both the first and second mesh materials can be provided in either a random or repeating pattern as desired and in a variety of shapes, although generally circular apertures are illustrated and discussed herein for simplicity. While both the apertures 354 and 386 allow wash water to flow through the side walls and bottom wall during use for satisfactory wetting and cleaning of the shoe, contaminants (e.g., dirt and grass) are preferably flushed out of the compartment 332 through the larger apertures 386 of the second mesh material of the transverse side walls and the bottom wall. In addition, the yarns of the first mesh material of the first panel 382 of the longitudinal side walls are selected to minimize abrasion, pilling and other undesirable damage of the shoe's side walls, seams, laces, etc. during the machine wash process. The smaller aperture size and smooth, non-abrasive hand of the first material is believed to contribute to such a minimization of undesirable shoe damage.

Figure 4:
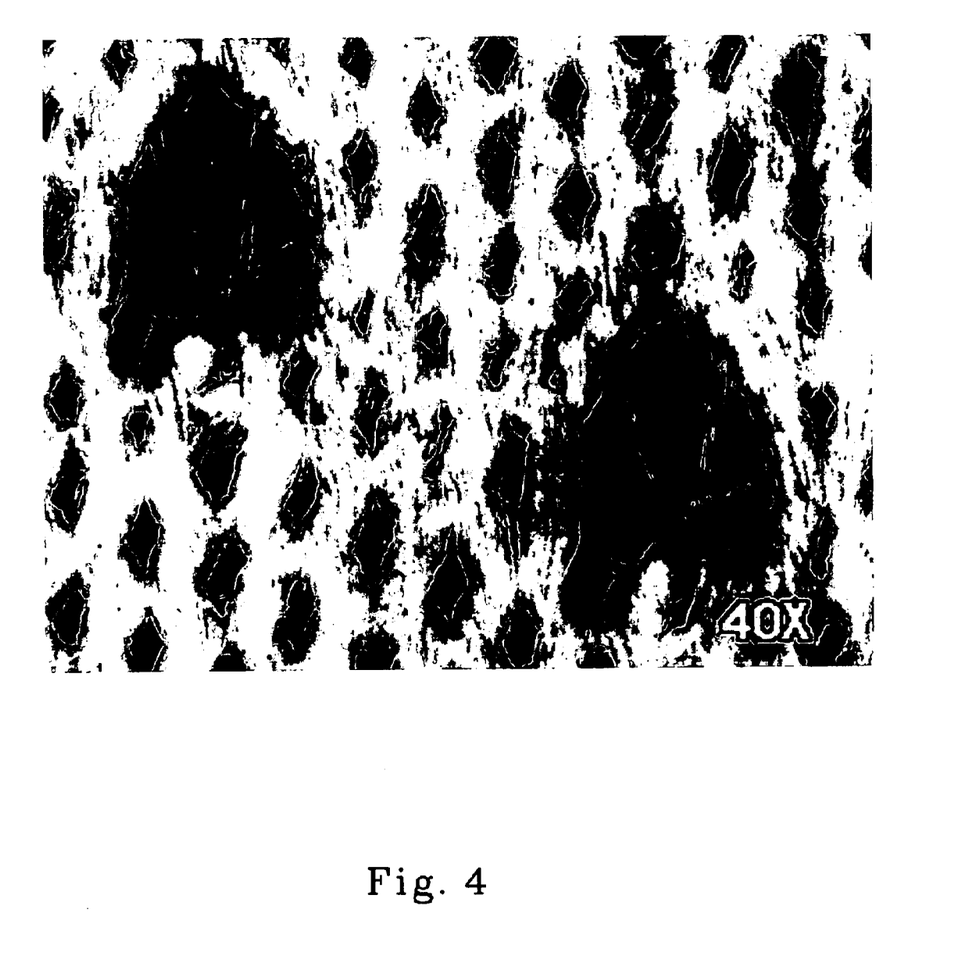
FIG. 4 is a 40× photomicrograph of a first mesh material suitable for use with the present invention, wherein the first or inner panel of the shoe bag of FIG. 1 is formed from this material.

With reference to FIG. 4, the first mesh material is preferably provided in the form of a fabric having apertures 354 whose average open area is less than about 5 mm$^2$, and more preferably, between about 0.5 mm$^2$ and about 5 mm$^2$ and most preferably between about 0.6 mm$^2$ and about 2 mm$^2$ The aperture density is preferably at least about 0.05 apertures per mm$^2$, more preferably, between about 0.1 and about 0.4 apertures per mm$^2$ of panel surface area. Generally, each of the first panels of the longitudinal side walls have a total open area between about 10 cm$^2$ and about 800 cm$^2$, depending upon the overall dimensions of the shoe bag. Preferably, each of the first panels of the longitudinal side walls has a total open area between about 50 cm$^2$ and about 400 cm² and more preferably between about 75 cm² and about 150 cm². Thus, the percent ratio of the total surface area of each of the first panels of the longitudinal side walls 336A and 336B to the total open area of each of the first panels (i.e., (total open area)/(total surface area)) of the longitudinal side walls 336A and 336B is preferably between about 5% and about 50% and, more preferably, is between about 10% and about 25%, and most preferably is about 15%.

In the event that the first mesh material is woven, the yarns used to form the first mesh material can comprise either microdenier or non-microdenier filaments. For microdenier filaments, the first yarn is preferably a two ply, seventy denier yarn having about one hundred microdenier filaments per ply (i.e., a 2/70/100 yarn), wherein the filaments are formed from polyester while the second yarn is preferably a single ply, forty denier yarn having about twenty filaments per ply (i.e., a 1/40/20 yarn) and wherein the filaments are formed from polyester. Other micro denier yarns having similar constructions can be substituted. The microdenier first mesh material can be formed from the yarns using a circular knit (i.e., a weft-knitted fabric produced in tubular form) or other woven processes and patterns known in the art. For non-microdenier filaments, the first yarn of the first mesh material is preferably a single ply, one hundred and fifty denier yarn having about sixty-eight non-microdenier filaments per ply (i.e., a 1/150/68 yarn), wherein the filaments are formed from polyester or other material which does not substantially adsorb dyes during a wash cycle while the second yarn is the same as previously described. Other non-micro denier yarns having similar constructions can be substituted. The first mesh material has a weight, per ASTM 3776-96, of at least about 60 gms/m² and preferably between about 60 gms/m² and about 210 gms/m² and more preferably between about 100 gms/m² and about 150 gms/m².

Figure 5:
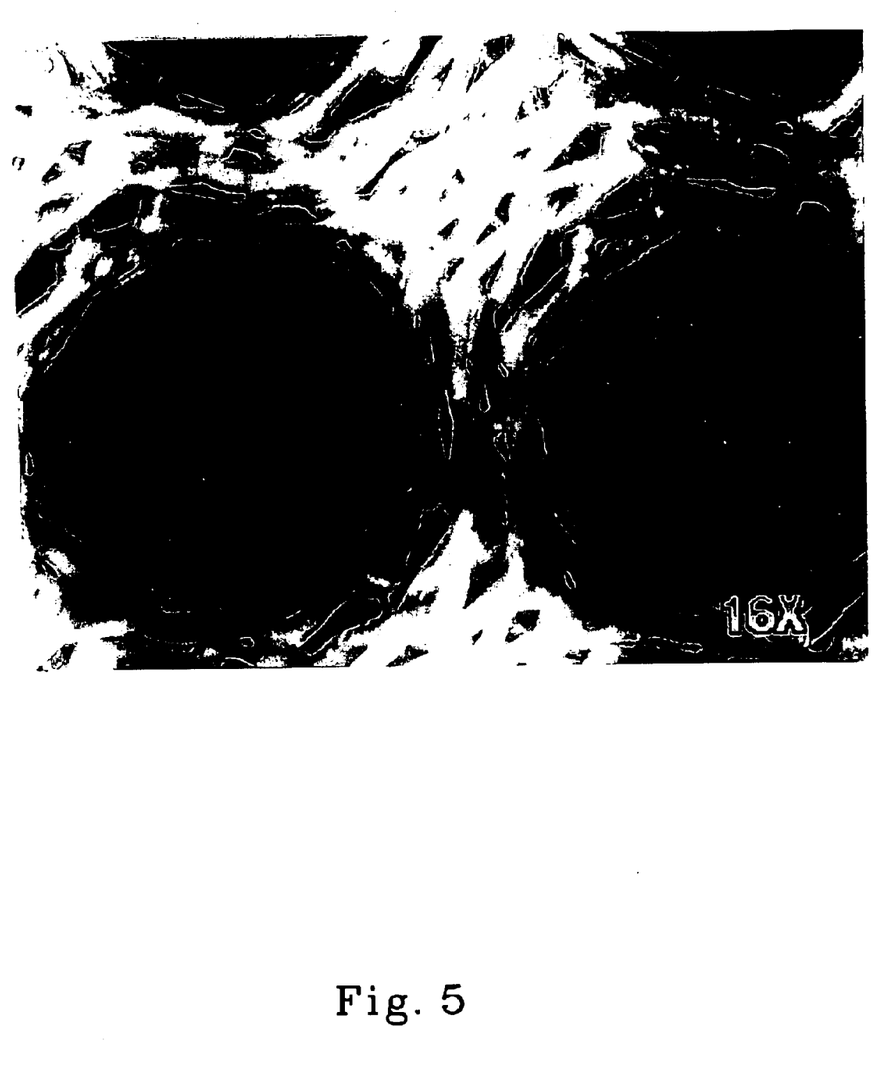
FIG. 5 is a 16× photomicrograph of a second mesh material suitable for use with the present invention, wherein the second or outer panel of the shoe bag of FIG. 1 is formed from this material.

With reference to FIG. 5, the second mesh material, which is used to form the transverse side walls 336C and 336D, the bottom wall 338 as well as the second panel 385 of the longitudinal side walls 336A and 336B, is preferably provided in the form of a fabric having apertures 386 whose average open area is between about 5 mm² and about 75 mm² and, more preferably between about 5 mm² and 15 mm². The aperture density is preferably at least about 0.01 apertures per mm², more preferably between about 0.02 mm² and about 0.04 mm² of wall surface area. Generally, the combination of the transverse side walls and the bottom wall have a total open area of between about 10 cm² and about 800 cm², depending upon the overall dimensions of the shoe bag, in order to adequately flush contaminants from the compartment 332 of the shoe bag 320. Preferably, the combination of the transverse side walls and the bottom wall have a total open area of between about 100 cm² and about 400 cm², and, more preferably, between about 225 cm² and about 275 cm². Thus, the percent ratio of the total surface area of each of the panels of the transverse side walls 336C and 336D to the total open area of each of the panels of the transverse side walls 336C and 336D is between about 20% and about 70% and more preferably between about 30% and about 40% and most preferably about 35%.

In the event that the second mesh material is woven, the yarns used to form the second mesh material can comprise either microdenier or non-microdenier filaments. The first and/or second yarns used to form the second mesh material are preferably single ply, one hundred fifty denier yarns having about thirty-four filaments per ply (i.e., a 1/150/34 yarn), wherein the filaments are formed from polyester or other material which does not substantially adsorb dyes during a wash cycle. The second mesh material can be formed from the yarns using any woven process (e.g., knitting) or pattern known in the art. The second mesh material has a weight, per ASTM 3776-96, of at least about 100 gms/m² and preferably between about 100 gms/m² and about 350 gms/m² and more preferably between about 125 gms/m² and about 200 gms/m².

In other embodiments, the shoes may be place in a containment bag, or other type of container, that is designed to reduce the time it takes the shoes to dry after the washing process. For example, for a U.S.-type washing machine, the containment bag could be configured to hold the shoes inside pockets with the soles facing upward, and the toes of the shoes pointing in the same direction that the agitator rotates during the spin cycle of the washing machine.

It is preferred that the containment bag or other flexible container be provided with a sealing means which is sufficiently stable to remain closed during the treating process. Simple tie strings or wires, various snap closures such as ZIP LOCK® closures, and VELCRO®-type closures, contact adhesives, adhesive tape, zipper-type closures and the like, suffice. In the embodiment shown in the drawings, the opening is closed during use by cord 50 and slide lock 52.

The shoes may either be placed in the same containment bag, or in separate containment bags, and the bag or bags placed into a wash solution. The containment bag with the shoes therein is then placed into a washing machine. The washing machine is turned on and the shoes are washed.

Preferably, the temperature and pH of the wash solution are controlled to minimize any damage to leather containing surfaces of the shoes. The wash solution may be controlled so that it has a pH of from about 4 to about 10, or from about 5 to about 10, or from about 6 to about 9, and a temperature from about 40° F. (5° C.) to about 180° F. (80° C.), or from about 50° F. to about 150° F. (66° C.), or from about 60° F. (15° C.) to about 100° F. (40° C.). Techniques for controlling pH at recommended usage levels include the use of buffers, alkalis, acids, etc., and are well known to those skilled in the art. Without wishing to be bound by any particular theory, higher temperatures and pH's are believed to enhance cleaning performance, however, those same high temperatures and pH's may cause excessive damage to the shoes. It is believed that Chromium can be extracted from leather to a greater extent at higher temperatures and/or damage to shoes increases as temperature of wash solutions increase.

After the washing process, the shoes are removed from the washing machine and dried. The shoes can be dried in any suitable manner, such as by: air drying, drying in a clothes dryer, or drying with an implement, such as a hair dryer or a shoe dryer.

Articles of Manufacture/Instructions

The present invention also relates to benefit agent-containing pre-treating compositions incorporated into a dispenser (such as a spray dispenser or other type of dispenser) to create an article of manufacture that can facilitate treatment of shoes with said pre-treating compositions. The spray dispenser can comprise manually activated and non-manual powered (operated) spray means and a container containing the pre-treating composition. For through the wash (wash-added and/or rinse-added) methods, the article of manufacture can simply comprise a benefit agent-containing pre-treating composition and a suitable container.

The articles of manufacture are preferably provided in association with instructions for use to ensure that the consumer applies proper amounts of the benefit agent(s) to provide the desired benefit(s). For example, the instructions for use can include, but are not limited to instructions for: applying the pre-treating compositions to the shoes before wearing/soiling the shoes; the manner of applying the pre-treating compositions; applying the pre-treating compositions in an amount sufficient to provide the benefits described herein, yet are not so great of an amount that it is noticeable on the shoes after the pre-treating composition dries; if a washing process is used to apply the pre-treating composition, the manner of applying the shoes to the pre-treating composition to the shoes in the washing process; the temperature of the wash water; washing time; recommended settings on the washing machine; drying the shoes after applying the pre-treating composition; instructions for washing the shoes after the shoes are worn, which may include applying one of the cleaning and/or conditioning compositions described herein which has a substance therein for removing the previously applied pre-treating composition and soil on the shoes; re-applying the pre-treating composition after the shoes have been washed and dried; and other instructions for providing softness, suppleness, deodorization, disinfecting, or other desirable properties. Preferably, under typical U.S. wash conditions in residential and/or consumer equipment, the recommended settings on the washing machine are medium load, heavy duty, 12–14minutes, warm wash, preferably and cold rinse cycle.

It is important that the instructions be as simple and clear as possible. Accordingly, the use of pictures and/or icons to assist in explaining the instructions is desirable. The instructions can be provided with packages containing the pre-treating compositions, or with other forms of advertising associated with the sale or use of the pre-treating compositions. The instructions may include providing instructions on a label attached to the container holding the composition; on a sheet either attached to the container or accompanying it when purchased; or in advertisements, demonstrations, video tapes, CD ROM's, and/or other written or oral instructions which may be connected to the purchase of the pre-treating compositions.

Shoe Treatment Kit

The article(s) of manufacture of the present invention may be packaged together with one or more other articles of manufacture in an outer package to form a shoe treatment kit.

The shoe treatment kit may comprise any of the articles described herein, including, but not limited to: a dispenser or the like comprising the pre-treating composition(s), such as a spray dispenser; containers containing cleaning and/or conditioning compositions, applicators for these compositions; a flexible container (such as a bag) for the shoes; shoe drying devices; and instructions for using any of these.

Preferably, a shoe treatment composition in kit form in accordance with the present invention, comprises the following components:

a) an article of manufacture comprising a pre-treating composition for pre-treating one or more shoes comprising one or more benefit agents in a package in association with instructions for use which direct a consumer to apply at least an effective amount of the one or more benefit agents to provide one or more desired benefits to the one or more shoes;

b) a flexible container, preferably reusable flexible container, suitable for holding one or more of the shoes; and c) an outer package containing the components a) and b).

Additionally, an article, such as a benefit agent-impregnated cloth and/or applicator, may be part of the kit. Such an article is particularly useful for post-treatment imparting of one or more desired benefits to one or more shoes. The shoes could be rubbed or otherwise contacted with the article after washing the shoe. The post wash wipe or article would be used to deposit various benefit agents on the shoe. These would include but not be limited to soil release agents, waterproofing agents, leather or fabric or plastic treatment agents, antimicrobial agents, shine enhancing ingredients, ingredients designed to improve the appearance of the often painted exterior of athletic shoe leather. This post wash treatment can also be used, and preferably is used on new and/or clean shoes.

The following examples are meant to exemplify compositions of the present invention, but are not necessarily meant to limit or otherwise define the scope of the invention. It should also be understood that the amounts and percentages specified in this specification and in the tables below can be rounded if desired, and/or provided in the form of a range which includes the amounts and percentages specified. In addition, any of these amounts and percentages can be considered to be "about" the amounts specified, or "about" the rounded amounts and percentages.

Formulation and Method Examples

Suitable treating compositions and methods that are especially useful as treating compositions (suitable for making shoes easier to subsequently clean) in accordance with the present invention are as follows.

In the first Example, pre-treatment compositions are provided which can be sprayed on the clean shoes prior to wearing the shoes. The shoes can then be washed after they are worn.

EXAMPLE 1

Spray On

| Component | A | B | C | D |
|---|---|---|---|---|
| Polymeric release agent[1] | 2.5% | 2.5% | 2.5% | 1% |
| Surfactant[2] | — | 3% | 3% | 0.5% |
| Softening agent[3] | — | 1% | 1% | — |
| Substantive perfume | — | — | 1% | — |
| Ethanol | | | | 50% |
| Disinfectant | — | — | — | 0.5% |
| Water | 97.5% | 93.5% | 92.5% | 48% |
| TOTAL | 100% | 100% | 100% | 100% |

[1]A suitable polymeric release agent is Carboxymethylcellulose available from Hercules, Type 7LF.
[2]A suitable surfactant is Neodol 23-9 available from Shell Chemicals.
[3]Asuitable softening agent is DOWNY ® April Fresh Regular concentration fabric softener sold by The Procter & Gamble Company of Cincinnati, Ohio, USA, and described in one or both of U.S. Pat. Nos. 4,424,134 and 4,767,547.

EXAMPLE 2

Through the Rinse

In this Example, rather than spraying a pre-wear treating composition onto the shoes, the treating composition is applied to the shoes when the shoes are washed. In one non-limiting embodiment, the treating composition is applied during the rinse cycle when the shoes are washed in a washing machine.

The treating composition can be added in any suitable concentration during the washing process. In one non-limiting embodiment, the treating composition in the form of carboxymethylcellulose is provided in a concentration of about 2,000–2,500 ppm in the rinse water during the rinse cycle. In order to perform its treating function in the washing process, a more active sample of carboxymethylcellulose is used than in the case of the first Example where the treating composition is sprayed directly onto the shoes. In one non-limiting variation of this example, a 30% active sample of carboxymethylcellulose from Penn Carbose, Inc. can be used. The carboxymethylcellulose can be added into the rinse cycle in any suitable manner. In one preferred embodiment, carboxymethylcellulose is placed in a DOWNY® fabric softener dosing ball sold by The Procter & Gamble Company of Cincinnati, Ohio, USA.

The shoes are thereafter worn. When the shoes are in need of treatment, the shoes are washed, such as in a washing machine. During the washing process, the compositions described above having enzymes therein can be added, preferably to the water in the wash cycle. During the rinse cycle, the carboxymethylcellulose can again be added, and the cycle described herein can be repeated.

EXAMPLE 3

A cleaning agent-containing treating composition useful with the present invention, which has a whitening agent therein, can be formulated as follows:

|  | % Active Material | | |
|---|---|---|---|
|  | Example A | Example B | Example C |
| Acrylic Acid/Maleic Acid Copolymer (1) | 26.2 | 26.8 | 29.4 |
| Nonionic surfactant (2) | 12.6 | 12.8 | 11.6 |
| Tween 20 | 12.6 | 12.8 | 0.0 |
| Sodium Citrate | 1.7 | 1.7 | 0.0 |
| Sodium Hydroxide | 0.8 | 0.8 | 0.8 |
| Silicone suds suppresser | 0.3 | 0.3 | 0.3 |
| Glycerin | 0.0 | 0.0 | 2.0 |
| 2,2,4-Trimethyl-1,3-Propanediol | 0.0 | 0.0 | 1.0 |
| Thickening agent (3) | 0.0 | 0.0 | 0.2 |
| Minors (dye, perfume, preservative, stabilizers) | 2 | 2 | 2 |
| Protease (4) | 0.08 | 0.0 | 0.08 |
| Fluorescent whitening agent (5) | 0.2 | 0.2 | 0.2 |
| Water | 43.5 | 42.6 | 52.4 |

(1) Commercially available under the trade name SOKALAN CP-5 (40% active) from BASF.
(2) Commercially available under the trade name Neodol 23-9 from Shell Chemical Co.
(3) Trihydroxystearin.
(4) Protease is typically a mixture containing 34 mg/mL active protease.
(5) A suitable fluorescent whitening agent is commercially available under the trade name of Optiblanc LSN from 3V, Inc.

EXAMPLE 4

Conditioning agent-containing treating compositions useful with the present invention are formulated as follows:

| Component | Example A | Example B | Example C | Example D | Example E |
|---|---|---|---|---|---|
|  | Weight % (Active Weight %) | | | | |
| Conditioning Agent[1] | 33 (12) | 40 (15) | 33 (12) | 33 (12) | 33 (12) |
| Conditioning Agent[2] | 0 | 0 | 6 (2) | 0 | 0 |
| Substantive Perfume | 0.3 | 0.3 | 0.3 | 0.3 | 0.3 |
| Disinfecting Agent[3] | 0 | 1 | 0 | 1 | 1 |
| Nonionic Surfactant[4] | 0 | 0 | 1 | 1 | 1 |
| Odor Control Agent[5] | 0 | 2 (1.0) | 0 | 0 | 0 |
| Propylene glycol | 0 | 0 | 0 | 0 | 4 |
| Water | Balance | balance | balance | balance | balance |

[1] A suitable conditioning agent is commercially available under the tradename LUBRITAN AS from Rohm and Haas Company.
[2] A suitable conditioning agent is commercially available under the tradename GE Silicone CM2233 from General Electric Company.
[3] A suitable disinfecting agent is a $C_9$ fatty acid commercially available from Celanese Chemicals of Dallas, Texas, USA; or Sigma-Aldrich Corporation of St. Louis, MO, USA.
[4] A suitable nonionic surfactant is commercially available under the tradename NEODOL 23-6.5 from Shell Chemical Company.
[5] A suitable odor control agent is β-cyclodextrin.

The pH of such a conditioning composition will be about 4.5.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the subject invention have been described, it will be obvious to those skilled in the art that various changes and modifications of the subject invention can be made without departing from the spirit and scope of the invention. It will be clear to those skilled in the art that various changes and modifications may be made without departing from the scope of the invention and the invention is not to be considered limited to the embodiments and examples that are described in the specification.

What is claimed is:

1. A pre-treating composition for shoes comprising a polymeric soil release agent of polysaccharide having a degree of substitution ranging from about 0.6 to about 1.2 and molecular weight of less than 1,000,000 in an amount effective to provide soil release benefit, and a spreading agent, wherein the pre-treating composition is adapted to provide improved removal of soil from the shoes in washings subsequent to application of the pre-treating composition to the shoes over removal of soil from the shoes in washing without application of the pre-treating composition to the shoes.

2. A pre-treating composition according to claim 1 wherein the molecular weight of the polysaccharide is less than about 500,000.

3. A pre-treating composition according to claim 2 wherein the molecular weight of the polysaccharide is less than about 250,000.

4. A pre-treating composition according to claim 1 wherein the spreading agent is a nonionic surfactant.

5. A pre-treating composition according to claim 1 wherein the spreading agent is a nonionic surfactant.

6. A pre-treating composition according to claim 1 further comprising an antimicrobial agent.

7. A pre-treating composition according to claim 1 further comprising a drying agent.

8. A pre-treating composition according to claim 7 wherein the drying agent comprises ethanol.

9. A pre-treating composition according to claim 6 wherein said antimicrobial agent is water insoluble, and saud water insoluable antimicrobial is made soluable by the addition of the ethanol to an aqueous system.

10. A pre-treating composition according to claim 1, comprising from about 0.1 to about 95% of the polymeric soil release agent.

11. A pre-treating composition according to claim 1, comprising from about 0.1 to about 10% of the polymeric soil release agent.

12. A pre-treating composition according to claim 1, comprising from about 0.1 to about 5% of the spreading agent.

13. A pre-treating composition according to claim 1, comprising from about 1 to about 50% of the spreading agent.

* * * * *